UNITED STATES PATENT OFFICE.

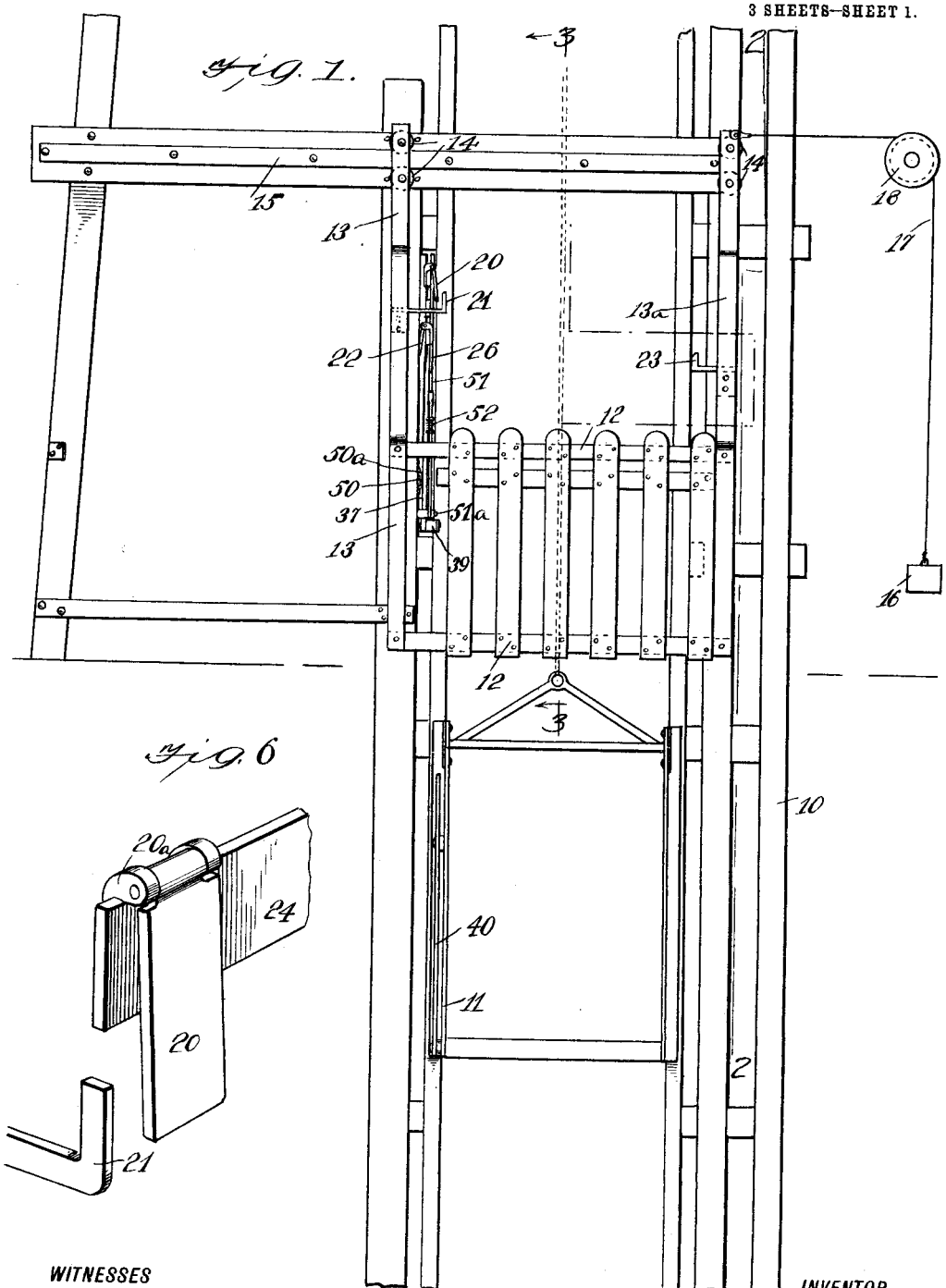

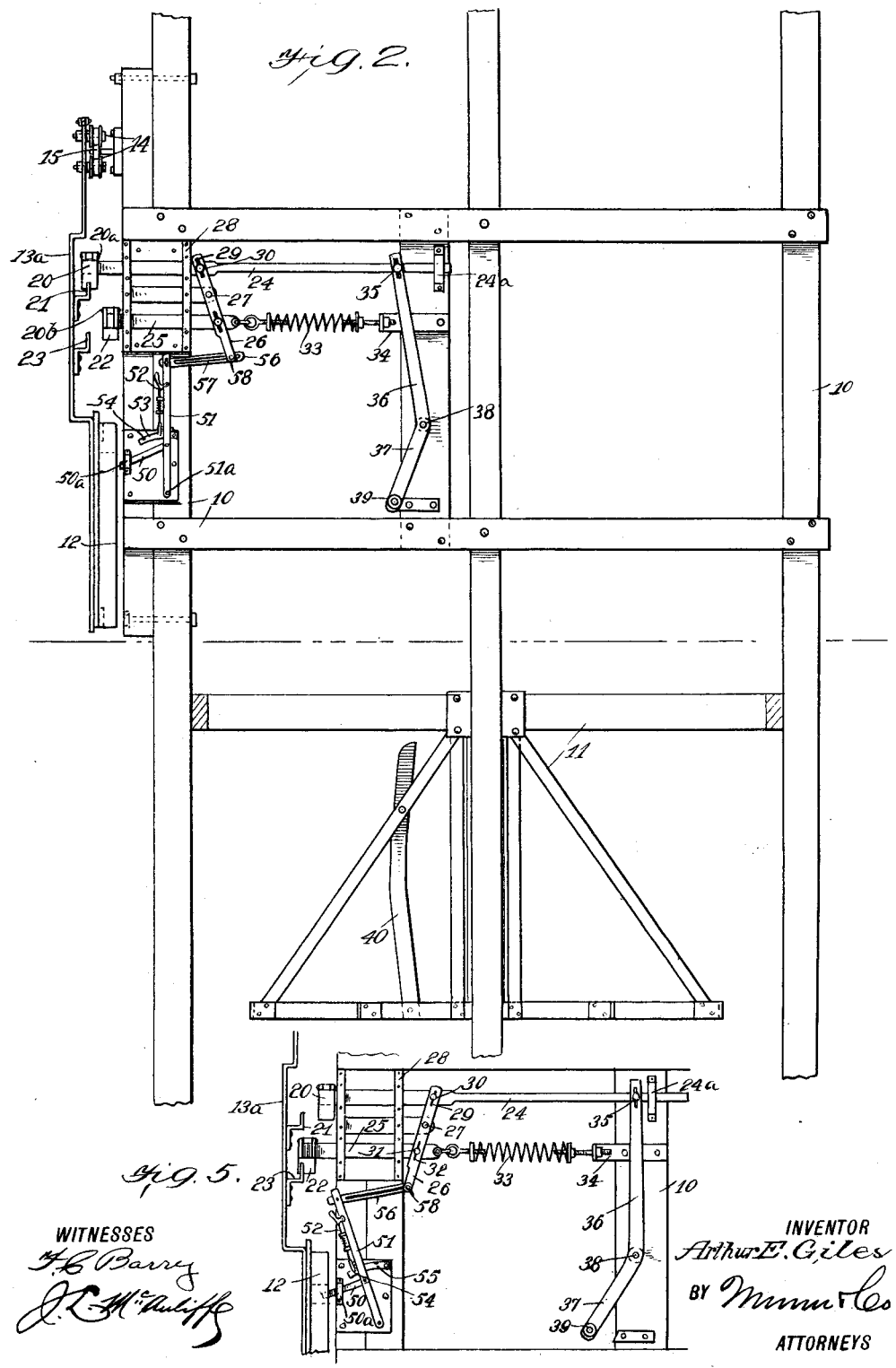

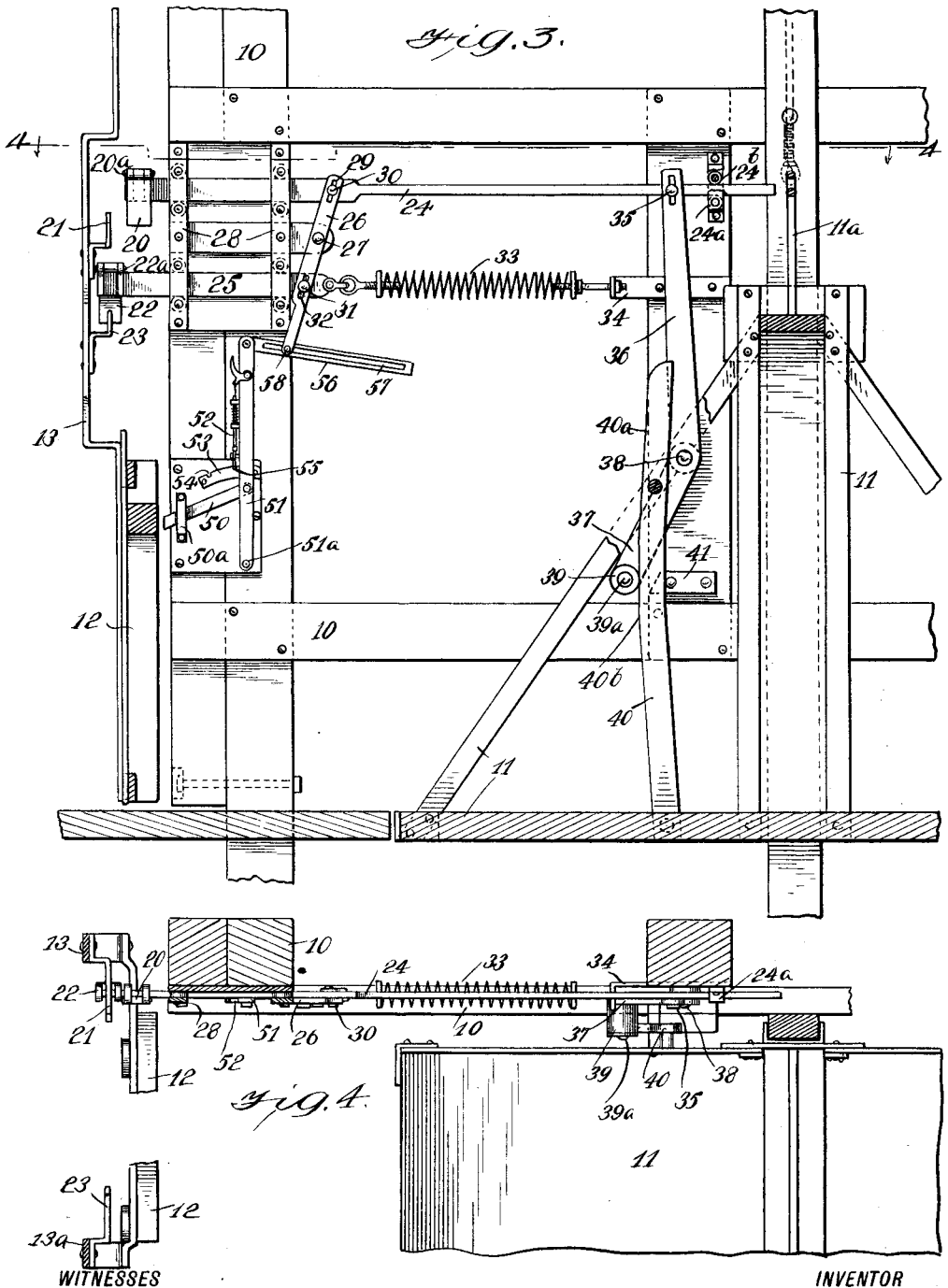

ARTHUR EDWIN GILES, OF LATROBE, PENNSYLVANIA.

GATE-CONTROLLING MEANS.

1,051,729. Specification of Letters Patent. Patented Jan. 28, 1913.

Application filed September 14, 1912. Serial No. 720,350.

*To all whom it may concern:*

Be it known that I, ARTHUR E. GILES, a citizen of the United States, and a resident of Latrobe, in the county of Westmoreland and State of Pennsylvania, have invented a new and Improved Gate-Controlling Means, of which the following is a full, clear, and exact description.

My invention relates to automatic means for controlling the gate at the entrance to any shaft, hole or lift, by movements of the cage, elevator, bucket, or moving platform hereinafter termed a cage.

The invention, while designed primarily to meet the requirements of the Pennsylvania State mining laws with regard to the cages of mine shafts, is applicable to the gates of shafts, elevators, lifts, or towers generally.

Objects of the invention are to provide for automatically locking the gate when closed, for automatically unlocking the gate when the cage has been brought to the proper position at a landing, automatically holding the gate open so long as the cage remains in the predetermined position, and for automatically releasing the gate and causing it to close when the cage is moved above or below the landing or other predetermined point.

The distinguishing features of my invention, and the important structural elements characterizing the preferred embodiment which is illustrated as an example, will be more particularly explained in the specific description hereinafter to be given.

Reference is to be had to the accompanying drawings forming a part of this specification, in which similar characters of reference indicate corresponding parts in all the views.

Figure 1 is a front elevation showing my gate-controlling means applied to a gate of a mine shaft elevator; Fig. 2 is a sectional elevation, the section being taken on approximately the line 2—2 in Fig. 1, certain movable stops to prevent the opening and closing of the gate being in the position they occupy to prevent the opening of the gate; Fig. 3 is for the most part, a vertical section on approximately the line 3—3 of Fig. 1, and looking in the direction of the arrows, certain elements, however, shown at the right of Fig. 1, including parts of the gate hangers and appurtenances, not within the section line indicated, being included in Fig. 3, as hereinafter referred to, the gate stops being in the position they occupy when the gate is to be opened; Fig. 4 is a fragmentary sectional plan view, the section being taken on about the line 4—4 of Fig. 3; Fig. 5 is an elevation similar to Fig. 2, but with the elevator cage omitted and a manually-controlled gate stop being shown in position to prevent opening of the gate, said view indicating the operative relation between the said manually controlled means and the main gate-controlling means actuated by the elevator cage; and Fig. 6 is a detail perspective view on an enlarged scale of the shutter device constituting a stop to prevent the opening of the gate, the view including also a bracket carried by one of the gate hangers for engagement with said stop.

The framework of the illustrated elevator given as an example, is indicated generally by the numeral 10, and moving vertically therein, and suitably guided, as usual, is an elevator cage 11. A gate 12 is arranged at a landing, and is suspended by hangers 13, 13ª, that are provided at their upper ends with upper and lower rollers 14, affording suspension and guided movement for the gate on a horizontal track 15. A weight 16, or its equivalent, is provided on a cord 17 connected with the gate and running over an idler 18, the tendency of the weight being to move the gate to the closed position, as indicated in Fig. 1. A stop 20 is provided to prevent the opening of the gate, and in the illustrated example, the stop is so positioned as to be engaged by an element on the adjacent gate hanger 13, (Fig. 1), the element in the form shown consisting of a bracket 21 which is given suitable bends to bring it into line with the stop 20 when the latter is in position to prevent the opening of the gate. The stop 20 is preferably in the form of a swinging shutter hinged at its upper end as at 20ª, to have movement in one direction, to wit, to the right. A similar stop 22 is provided to prevent the closing of the gate, as hereinafter described, said shutter being hinged as at 22ª to have swinging movement in one direction, to wit, to the left or the opposite direction to the movement of the stop 20. Any suitable member 23 on the opposite gate hanger 13ª is adapted to move the stop shutter 22 on its hinge; the action of the stops and members in contact therewith will be further explained hereinafter. The stop 20 is carried by a bar 24, which may be designated as a stop bar or shutter bar which ranges at right angles to the movement of the gate 12, and a second slide bar 25 parallel therewith carries the stop 22, said bars being connected with a lever 26 which is fulcrumed at 27 on a convenient point in the framework 10, the bars 24, 25, having sliding movement beneath guide members or straps 28, and the bar 24 having additional guided movement at one end between rollers $24^b$ on a keeper $24^a$. The connections between the lever 26 and the bars 24, 25, are at opposite sides of the fulcrum 27, so that the rocking of the lever 26 shifts one bar in one direction and shifts the other in a reverse direction. The connections between the lever and bars may be by means of a slot 29 and pin 30 and a pin 31 and a slot 32. A retractile spring 33 is arranged to have a tendency to slide the bar 24 outward and draw the bar 25 inward, to carry the stop 20 into position to prevent the opening of the gate. In the example shown, one end of the spring 33 is connected with the inner end of the bar 25, and the opposite end of the spring has suitable connections with a bracket 34 or any convenient element on the fixed framework 10.

To cause the stop bars 24, 25 to be shifted by the movement of the cage 11 against the tension of the retractile spring 33, I provide suitable co-acting means on the cage 11 and framework 10. In the example shown, a two-armed knocker lever is fulcrumed on the framework, being connected at its upper end as at 35, by a slot and pin connection with the bar 24, the knocker lever being composed of a longer arm 36 and a shorter arm 37, at an angle to each other, forming a modified bell crank lever or angle lever, which is fulcrumed to the framework as at 38 where the arms merge into each other. The lower, shorter arm 37 is provided at its end with a lateral pin $39^a$, fitted with a friction roller 39, which is adapted to be engaged by a trip arm 40 on the cage 11. With the described construction, as the cage 11 rises and approaches the landing provided with the gate 12, the trip arm 40 presents an outer edge $40^a$ so formed as to engage with and have a cam action on the roller 39 on the knocker lever, forcing said roller and the arm 37 of the lever outwardly, the upper arm 36 of the lever being rocked inwardly and carrying with it the stop bar 24 and its stop shutter 20, thus withdrawing said stop shutter out of the path of the bracket or equivalent element 21 on the adjacent gate hanger 13. Simultaneously through the action of the connected lever 26 which links the bar 24 to the bar 25, said bar 25 will be slid outwardly, carrying with it its stop shutter 22, and positioning said stop shutter in the path of movement of the rear bracket 23 provided on the opposite hanger $13^a$. It will thus be seen that the gate may now be opened, the rollers 14 traveling outward on the track 15, and the bracket 21 being clear of the stop 20. When the rear bracket 23 strikes the shutter 22, it will swing the latter until the shutter has been passed, after which said shutter will drop behind the upturned end of the bracket 23 and prevent the closing of the gate. The cam surface $40^a$ of the trip bar 40, extends gradually downward to a point $40^b$, after which the edge again recedes inward so that the point $40^b$ is that of greatest projection, giving the maximum throw to the roller 39 and arm 37 of the knocker lever. Upon a movement of the cage above or below the landing, after the gate has been opened and held open as described, a movement of the trip arm 40 in either direction permits the retractile spring 33 to act on the bar 25, lever 26 and bar 24, to rock the upper arm 36 of the lever outwardly, and causing the roller 39 to move inwardly as the trip arm 40 recedes. Just as the cage leaves the landing the bar 25 will be moved to withdraw the stop shutter 22 out of the path of the bracket 23 and permit the gate to close; the final closing of the gate causing the other bracket 21 to swing the stop shutter 20 until said shutter has dropped behind the upturned end of the bracket 21, thus again locking the gate against opening.

Since in actual practice the cage will move many times past the landing without there being any necessity of opening the gate at the landing, it is necessary in order to prevent undue wear on the movable parts of the gate-controlling means, to provide for throwing the said means out of operation, while yet holding the gate against being opened. For the purpose mentioned I make use of a manually-controlled, gate-locking device, having such a connection with the automatic controlling-means actuated by the cage, as to cause the automatic means to move to a position where they will not be affected by the movements of the cage, when the manually-controlled gate lock is moved to lock the gate. Thus a latch bar 50 has sliding movement beneath a keeper $50^a$ transversely to the path of movement of the gate, and adapted to be projected into the path to prevent the opening of the gate. The latch 50 is pivoted at its inner end to a lever 51, having a spring pawl 52 adapted to engage a quadrant 53, said quadrant being provided with notches 54, 55, to accommodate the spring pawl in different positions of the lever 51. The lever 51 is fulcrumed at one end, as at $51^a$, to the framework, and its opposite end has pivotal connection with a link 56, which has an elongated slot 57, in which moves the pin 58 carried by the previously described lever 26 which connects the two automatically-controlled stop bars 24, 25.

By the described construction, referring particularly to Fig. 5, and comparing the same with the arrangement of the parts as in Fig. 2, it will be seen that the pawl 52 of the lever 51 has been shifted from the inner notch 55 and that the said lever has been swung so that the pawl engages the outer notch 54; the outward movement of the lever has carried the latch 50 into the path of the gate 12, so that the said gate cannot be opened. At the same time the slotted link 56 has thrown the lever 26, and so shifted the stop bars and the stops 20, 22, as to permit the opening of the gate, except for the latch 50; also the knocker lever 36, 37, has been shifted so that the contact roller 39 will be out of the path of the automatic trip arm 40 on the cage 11. When it is desired to open the cage and the latch 50 is in the latching position, the lever 50 may be thrown by releasing the pawl 52.

It will be noted that when the pin 58 is at the free end of the link 56, a movement of the lever 26 under the influence of the spring 33 will tend to throw the lever 51 outward, but there can be a relative movement of the lever 51 and link 56 with respect to the lever 26 and its pin 58, by reason of the slot 57. When the latch 50 is in the outer position to engage the gate, and it is desired to open the gate upon the cage 11 arriving at the landing, the lever 51 can be thrown without affecting the movements of the stop bars and their stops 20, 22, and thus upon throwing the lever 51 and withdrawing the latch 50, the gate may be opened. It is not necessary to manually move the lever 51 backward in withdrawing the latch 50, since upon the raising of the pawl 52 the spring 33 will act through the bar 25, lever 26 and the link 56 to throw the lever 51 rearwardly. The described action of this spring 33 in withdrawing the latch 50 is permissible since, when the parts are in the position shown in Fig. 5 the roller 39 may move from the position of Fig. 5 to that of Fig. 3 in the withdrawal of the latch 50.

It will thus be seen that the manually-controlled, gate-latching means causes the automatic gate-controlling means to be thrown out of position to be operated automatically, but leaves the stops of the automatic controlling-means in position for the gate to be opened upon the withdrawal of the manually-controlled latch. It will be apparent furthermore, than when the manually-controlled device is not in use, the operation of the gate will be automatic, and at all times properly controlled to open upon the arrival of the cage at the landing, to be held open while the cage is at the landing, and to be automatically closed upon the cage leaving the landing in either direction.

Having thus described my invention, I claim as new, and desire to secure by Letters Patent:—

1. A gate-controlling means for elevators comprising movable stops to respectively prevent the opening and closing of the gate, means for actuating said stops by the elevator cage, to shift the one stop out of position and move the other into position, a manually-controlled stop device to prevent the opening of the gate, and operative connections between the said manually-controlled stop and the first-mentioned stops for throwing the latter out of position to be actuated by the elevator cage when the manually-controlled stop is thrown into operative position.

2. In means for controlling elevator gates, the combination of a gate-controlling device actuated by the movements of the elevator cage, and a manually-controlled gate stop, and actuating means therefor located at the elevator landing, serving to prevent the opening of the gate and having connection with the first-mentioned controlling device, and serving, when moved to a position to function, to render said first-mentioned means inoperative by the cage.

3. In a gate-controlling means for elevators, the combination with the elevator gate and cage, of oppositely reciprocating, spring-actuated members provided respectively with devices to prevent the opening and the closing of the gate, means tending to close the gate, means on the elevator cage to actuate the said reciprocating members, and a manually-controlled device having operative connection with the said members, to reciprocate the same to a position out of operative relation to the elevator cage.

4. In a controlling-means for elevator gates, the combination of elements to prevent the opening and the closing of the gate, said elements being arranged to move reversely to each other into and out of position, means for actuating said elements by the movement of the elevator cage, and manually-controlled devices having operative connection with the said elements, to move the same to a position out of operative relation to the elevator cage.

In testimony whereof I have signed my name to this specification in the presence of two subscribing witnesses.

ARTHUR EDWIN GILES.

Witnesses:
H. E. FRAMPTON,
JAMES WOODS.

Copies of this patent may be obtained for five cents each, by addressing the "Commissioner of Patents, Washington, D. C."